(12) United States Patent
Blair

(10) Patent No.: US 12,681,987 B2
(45) Date of Patent: Jul. 14, 2026

(54) PREDICTIVE AND REAL-TIME ADAPTIVE MUSIC RECOMMENDATION SYSTEM AND METHOD

(71) Applicant: Paul Allen Blair, London (GB)

(72) Inventor: Paul Allen Blair, London (GB)

( * ) Notice: Subject to any disclaimer, the term of this patent is extended or adjusted under 35 U.S.C. 154(b) by 0 days.

(21) Appl. No.: 19/013,991

(22) Filed: Jan. 8, 2025

(65) Prior Publication Data

US 2026/0195376 A1 Jul. 9, 2026

(51) Int. Cl.
*G06F 16/635* (2019.01)
*G06F 16/638* (2019.01)

(52) U.S. Cl.
CPC .......... *G06F 16/636* (2019.01); *G06F 16/637* (2019.01); *G06F 16/639* (2019.01)

(58) Field of Classification Search
CPC ..... G06F 16/636; G06F 16/637; G06F 16/639
See application file for complete search history.

(56) References Cited

U.S. PATENT DOCUMENTS

| | | | | | |
|---|---|---|---|---|---|
| 10,078,691 | B2 * | 9/2018 | Zhang | ............... | G06V 40/70 |
| 11,451,870 | B1 * | 9/2022 | Panchaksharaiah | ............... | |
| | | | | | H04N 21/44226 |
| 11,675,798 | B2 * | 6/2023 | Rigby | ............... | G06F 16/436 |
| | | | | | 707/734 |
| 2011/0295843 | A1 * | 12/2011 | Ingrassia, Jr. | ....... | G06F 16/4387 |
| | | | | | 707/723 |

| | | | | | |
|---|---|---|---|---|---|
| 2013/0123583 | A1 * | 5/2013 | Hill | ............... | G06F 16/284 |
| | | | | | 600/300 |
| 2014/0074479 | A1 * | 3/2014 | Kassam | ............... | G10L 25/48 |
| | | | | | 704/270 |
| 2014/0277649 | A1 * | 9/2014 | Chong | ............... | G06F 16/636 |
| | | | | | 700/94 |
| 2015/0093729 | A1 * | 4/2015 | Plans | ............... | G09B 5/00 |
| | | | | | 434/262 |
| 2015/0186780 | A1 * | 7/2015 | Zhang | ............... | G06F 16/636 |
| | | | | | 706/46 |
| 2016/0346604 | A1 * | 12/2016 | Lindstrom | ......... | G06Q 30/0241 |
| 2016/0371372 | A1 * | 12/2016 | Chong | ............... | H04H 60/65 |
| 2018/0314959 | A1 * | 11/2018 | Apokatanidis | ........... | G06N 5/04 |
| 2019/0142350 | A1 * | 5/2019 | Bastide | ............... | G16B 50/00 |
| | | | | | 600/300 |
| 2019/0246936 | A1 * | 8/2019 | Garten | ............... | A61B 5/316 |
| 2024/0054159 | A1 * | 2/2024 | Roy | ............... | G06F 16/632 |
| 2024/0134905 | A1 * | 4/2024 | Saavedra Plata | ....... | G06F 3/165 |

(Continued)

OTHER PUBLICATIONS

Karageorghis, Costas & Kuan, Garry & Schiphof-Godart, Lieke. (2021). Music in sport: From conceptual underpinnings to applications. 10.51224/B1023.

(Continued)

*Primary Examiner* — Jared M Bibbee

(57) ABSTRACT

Disclosed herein is a method for predictive and real-time adaptive music recommendation. The method comprises the steps of: acquiring data, the data comprising biometric data and user input data, the user input data indicating a context in which a playlist of music items is to be used; analyzing the data to determine a user state profile including a physiological state and a psychological state; and generating the playlist based on the user state profile. A corresponding system for predictive and real-time adaptive music recommendation is also disclosed.

12 Claims, 8 Drawing Sheets

(56)     References Cited

U.S. PATENT DOCUMENTS

2024/0181876 A1*   6/2024   Larsson ................. B60K 35/00

OTHER PUBLICATIONS

Karageorghis CI, Priest DL. Music in the exercise domain: a review and synthesis (Part I). Int Rev Sport Exerc Psychol. Mar. 2012;5(1):44-66. doi: 10.1080/1750984X.2011.631026. Epub Dec. 7, 2011. PMID: 22577472; PMCID: PMC3339578.

Karageorghis CI, Terry PC, Lane AM. Development and initial validation of an instrument to assess the motivational qualities of music in exercise and sport: the Brunel Music Rating Inventory. J Sports Sci. Sep. 1999;17(9):713-24. doi: 10.1080/026404199365579. PMID: 10521002.

Karageorghis, C.I. & Terry, Peter. (1996). The psychophysical effects of music in sport and exercise: A review. J Sport Behav. 20.

Karageorghis, C. I., & Terry, P. C. (2001). The effects of music on mood and perceptions of effort during exercise. Psychology of Sport and Exercise.

J Pates, C.I Karageorghis, R Fryer, I Maynard, Effects of asynchronous music on flow states and shooting performance among netball players, Psychology of Sport and Exercise, vol. 4, Issue 4, 2003.

Karageorghis, Costas & Jones, Leighton & Low, Daniel. (2006). Relationship Between Exercise Heart Rate and Music Tempo Preference. Research quarterly for exercise and sport. 77. 240-50. 10.1080/02701367.2006. 10599357.

Karageorghis CI, Mouzourides DA, Priest DL, Sasso TA, Morrish DJ, Walley CJ. Psychophysical and ergogenic effects of synchronous music during treadmill walking. J Sport Exerc Psychol. Feb. 2009;31(1):18-36. doi: 10.1123/jsep.31.1.18. PMID: 19325186.

Terry, Peter & Karageorghis, C. (2011). Music in sport and exercise. The new sport and exercise psychology companion.

Karageorghis CI, Priest DL. Music in the exercise domain: a review and synthesis (Part II). Int Rev Sport Exerc Psychol. Mar. 2012;5(1):67-84. doi: 10.1080/1750984X.2011.631027. Epub Dec. 7, 2011. PMID: 22577473; PMCID: PMC3339577.

Musicovery, retrieved from the internet, retrieved on Jan. 24, 2025; <URL: https://en.wikipedia.org/wiki/Musicovery>.

Pandora (service), retrieved from the internet, retrieved on Jan. 24, 2025; <URL:https://en.wikipedia.org/wiki/Pandora_(service)>.

Spotify, retrieved from the internet, retrieved on Jan. 24, 2025; <URL: https://en.wikipedia.org/wiki/Spotify>.

User:Yuhamidaru/stereomood, retrieved from the internet, retrieved on Jan. 24, 2025; <URL: https://en.wikipedia.org/wiki/User:Yuhamidaru/stereomood>.

* cited by examiner

100

112

- BIOMETRIC DATA
- USER INPUT DATA
- INHERENT CONTEXTUAL
  DATA

106

102

104

110

104

200

104

114

ACQUIRING DATA, THE DATA COMPRISING BIOMETRIC DATA AND USER INPUT DATA, THE USER INPUT DATA INDICATING A CONTEXT IN WHICH A PLAYLIST OF MUSIC ITEMS IS TO BE USED ⟋ 310

ANALYZING THE DATA TO DETERMINE A USER STATE PROFILE INCLUDING A PHYSIOLOGICAL STATE AND A PSYCHOLOGICAL STATE ⟋ 320

GENERATING THE PLAYLIST BASED ON THE USER STATE PROFILE ⟋ 330

PREPROCESSING THE BIOMETRIC DATA TO REMOVE NOISE AND ARTIFACTS — 410

IDENTIFYING KEY METRICS FROM THE PREPROCESSED BIOMETRIC DATA — 420

CLASSIFYING THE PHYSIOLOGICAL STATE AND THE PSYCHOLOGICAL STATE BASED ON A COMBINATION OF THE KEY METRICS AND THE USER INPUT DATA — 430

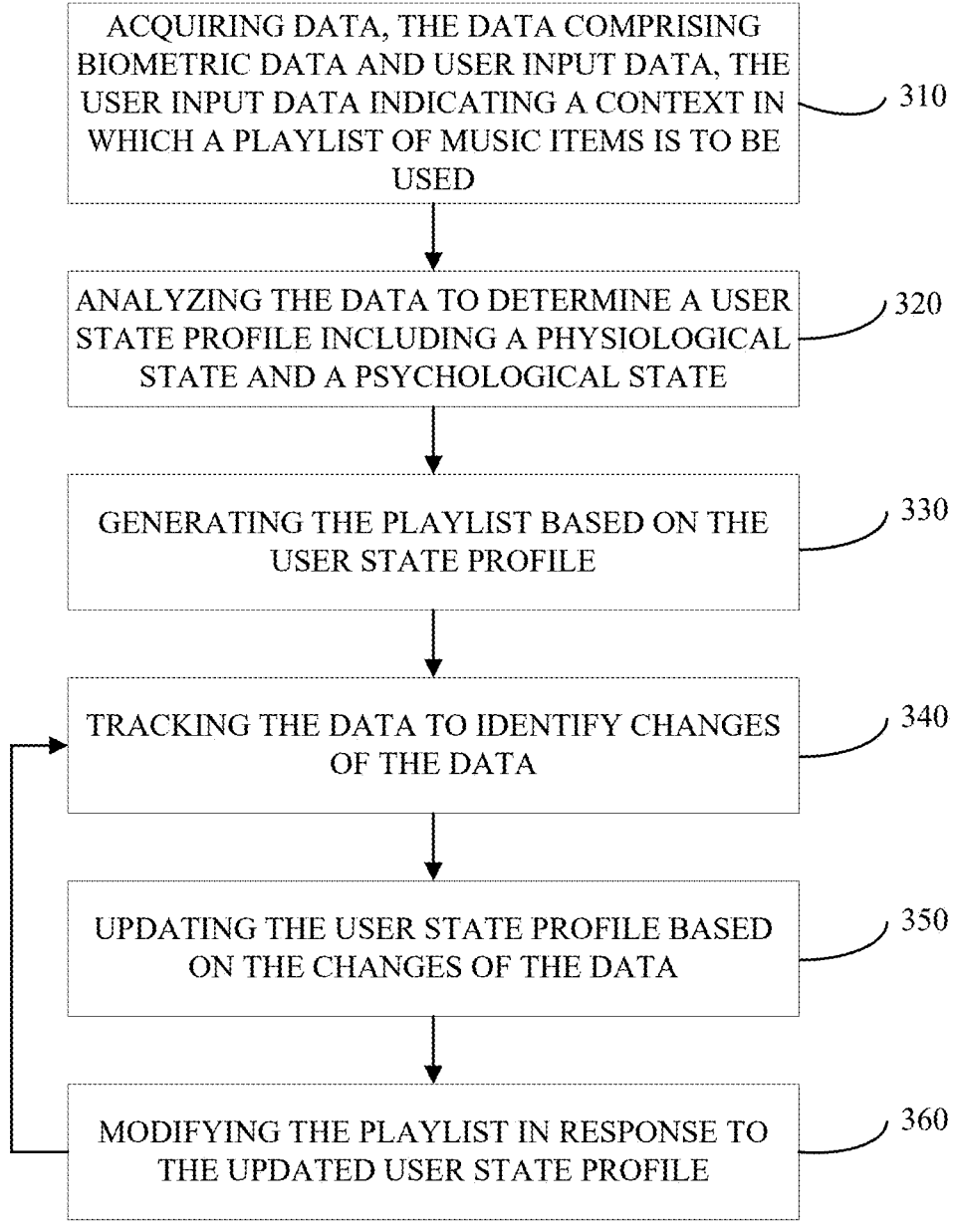

ACQUIRING DATA, THE DATA COMPRISING BIOMETRIC DATA AND USER INPUT DATA, THE USER INPUT DATA INDICATING A CONTEXT IN WHICH A PLAYLIST OF MUSIC ITEMS IS TO BE USED          310

ANALYZING THE DATA TO DETERMINE A USER STATE PROFILE INCLUDING A PHYSIOLOGICAL STATE AND A PSYCHOLOGICAL STATE          320

GENERATING THE PLAYLIST BASED ON THE USER STATE PROFILE          330

TRACKING THE DATA TO IDENTIFY CHANGES OF THE DATA          340

UPDATING THE USER STATE PROFILE BASED ON THE CHANGES OF THE DATA          350

MODIFYING THE PLAYLIST IN RESPONSE TO THE UPDATED USER STATE PROFILE          360

FIG. 5

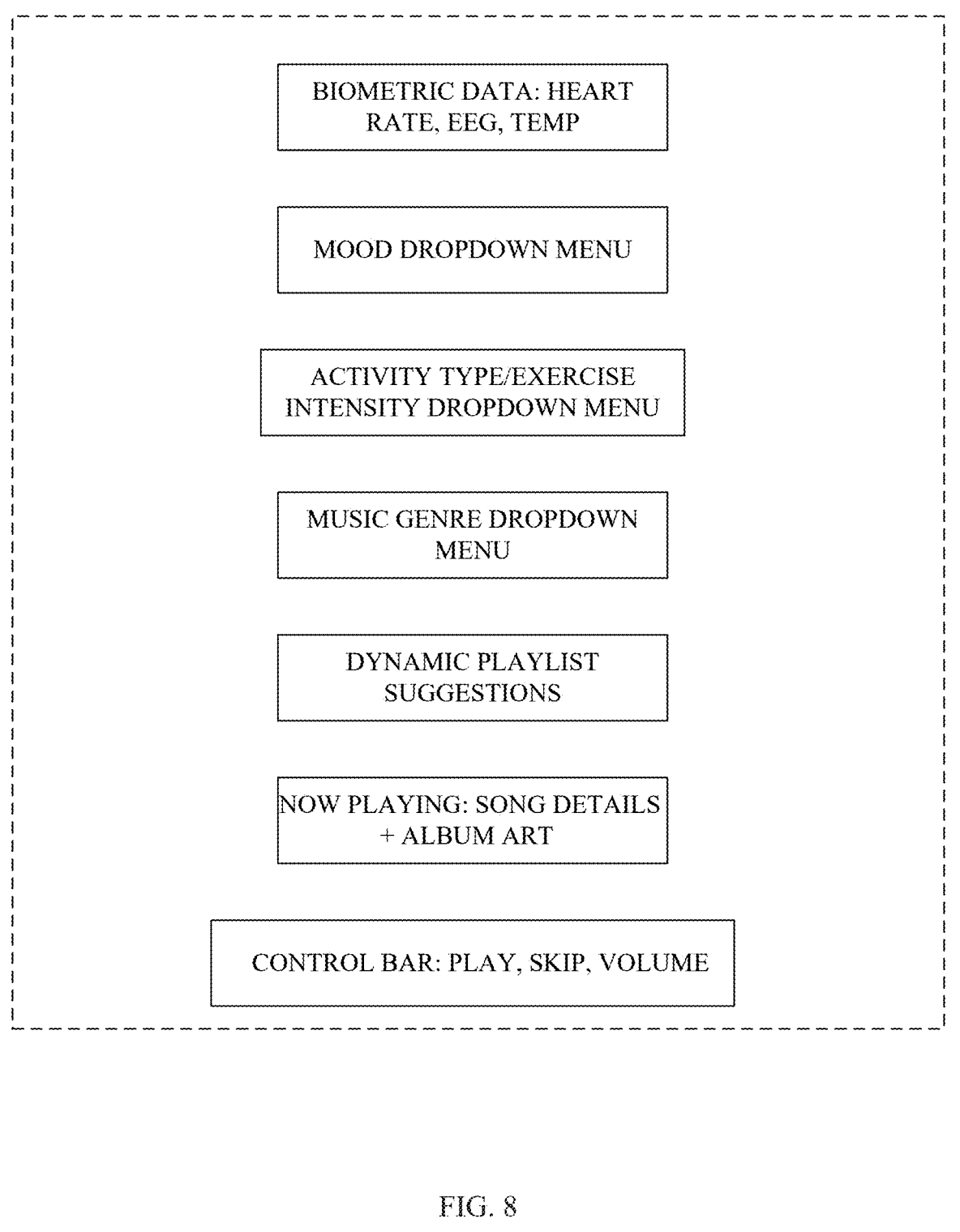

BIOMETRIC DATA: HEART RATE, EEG, TEMP

MOOD DROPDOWN MENU

ACTIVITY TYPE/EXERCISE INTENSITY DROPDOWN MENU

MUSIC GENRE DROPDOWN MENU

DYNAMIC PLAYLIST SUGGESTIONS

NOW PLAYING: SONG DETAILS + ALBUM ART

CONTROL BAR: PLAY, SKIP, VOLUME

FIG. 8

PREDICTIVE AND REAL-TIME ADAPTIVE MUSIC RECOMMENDATION SYSTEM AND METHOD

TECHNICAL FIELD

Generally, the present disclosure relates to the field of data processing. More specifically, the present disclosure relates to methods and systems for predictive and real-time adaptive music recommendation.

BACKGROUND

Music recommendation systems and services have gained widespread popularity as a means for users to discover and enjoy music that aligns with their personal tastes and interests. These systems typically rely on algorithms to identify music based on the user's explicitly stated preferences, which are often conveyed through manual actions such as selecting specific songs, creating playlists, or using features like "likes" and "favorites." By analyzing these inputs, recommendation systems aim to provide a tailored listening experience that resonates with individual users.

However, existing music recommendation systems and services exhibit significant limitations in their ability to adapt to the dynamic and evolving nature of users' preferences. These systems are generally static in their approach, focusing on a snapshot of a user's musical tastes rather than taking into account the changing contexts in which users enjoy music. For instance, users may prefer different types of music when they are working, exercising, commuting, or relaxing at home, and these preferences may shift rapidly depending on their mood, environment, or activity.

Therefore, there is a need for a music recommendation system and service that can enhance recommendation choices and user experience.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a predictive and real-time adaptive music recommendation method. The method may comprise the steps of: acquiring data, the data comprising biometric data and user input data, the user input data indicating a context in which a playlist of music items is to be used; analyzing the data to determine a user state profile including a physiological state and a psychological state; and generating the playlist based on the user state profile.

According to some embodiments, a predictive and real-time adaptive music recommendation system is disclosed. The system may comprise a processor and a memory. Modules are stored in the memory for execution by the processor. The modules may comprise a data acquiring module, an analysis module, and a recommendation module. The data acquiring module is configured to acquire data, the data comprising biometric data and user input data, the user input data indicating a context in which a playlist of music items is to be used. The analysis module is configured to analyze the data to determine a user state profile including a physiological state and a psychological state. The recommendation module is configured to generate the playlist based on the user state profile.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 5 is a flowchart of the method for predictive and real-time adaptive music recommendation, in accordance with some embodiments.

FIG. 8 is an illustration of a user interface of the present invention, in accordance with some embodiments.

DETAILED DESCRIPTION

Figure 1:
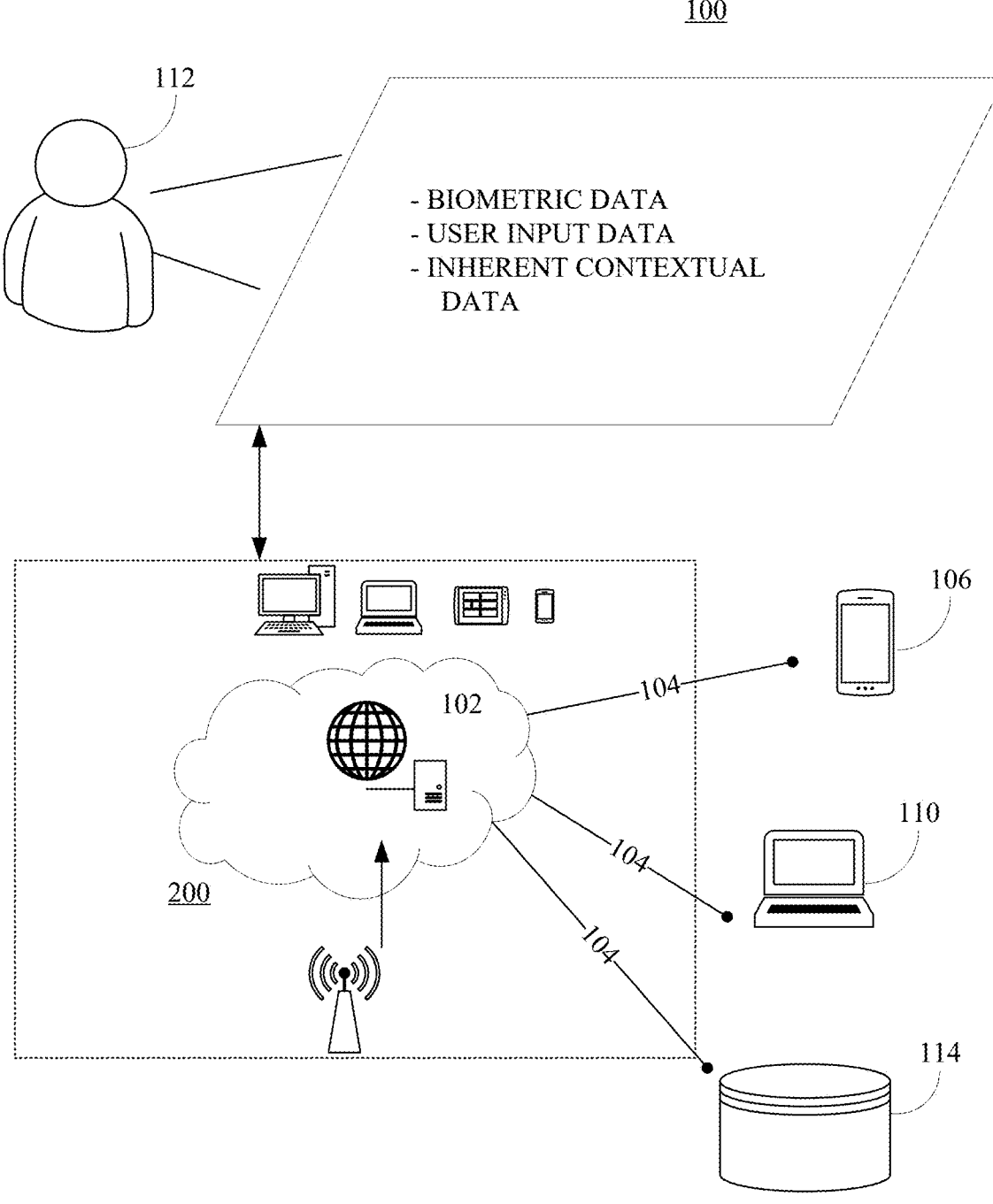
FIG. 1 is an illustration of a platform in accordance with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for predictive and real-time adaptive music recommendation, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a smart television, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, a GLO-NASS-K2 receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

OVERVIEW

The present disclosure describes methods and systems for predictive and real-time adaptive music recommendation. The present invention enhances physical performance, optimizes emotional states, and reduces perceived fatigue through personalized music experiences. The system integrates multi-modal biometric data (e.g., heart rate, EEG, EMG) with contextual user inputs (e.g., mood, fitness level, activity type, music preferences) to dynamically classify physiological and psychological states. Using a combination of machine learning algorithms and feedback-driven predictive analytics, the present invention generates and continuously adjusts playlists tailored to the user's evolving needs. Unique features include group synchronization based on aggregated biometric data and activity-specific playlist customization, offering a comprehensive and personalized approach to music recommendation. This multi-dimensional integration sets the present invention apart from prior art by leveraging real-time adaptation, predictive insights, and user context for enhanced physical and emotional well-being during various activities.

The present invention is preferably implemented as a software application that is executed on a computing device such as a personal computing device, a wearable device, a mobile device, or a server, among others.

Referring now to figures, FIG. 1 is an illustration of a platform 100 consistent with various embodiments of the present disclosure. By way of non-limiting example, the platform 100 that provides predictive and real-time adaptive music recommendation may be hosted on a centralized server 102, such as, for example, a cloud computing service. The centralized server 102 may communicate with other network entities, such as a mobile device 106 (such as a smartphone, a laptop, a tablet computer, etc.), other electronic devices 110 (such as a desktop computer, a server computer, a wearable fitness tracker or watch, a wireless controller, etc.), and databases 114 over a communication network 104, such as, but not limited to, the Internet. Further, users of the online platform 100 may include relevant parties. Accordingly, in some instances, electronic devices operated by the one or more relevant parties may be in communication with the platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device.

Figure 2:
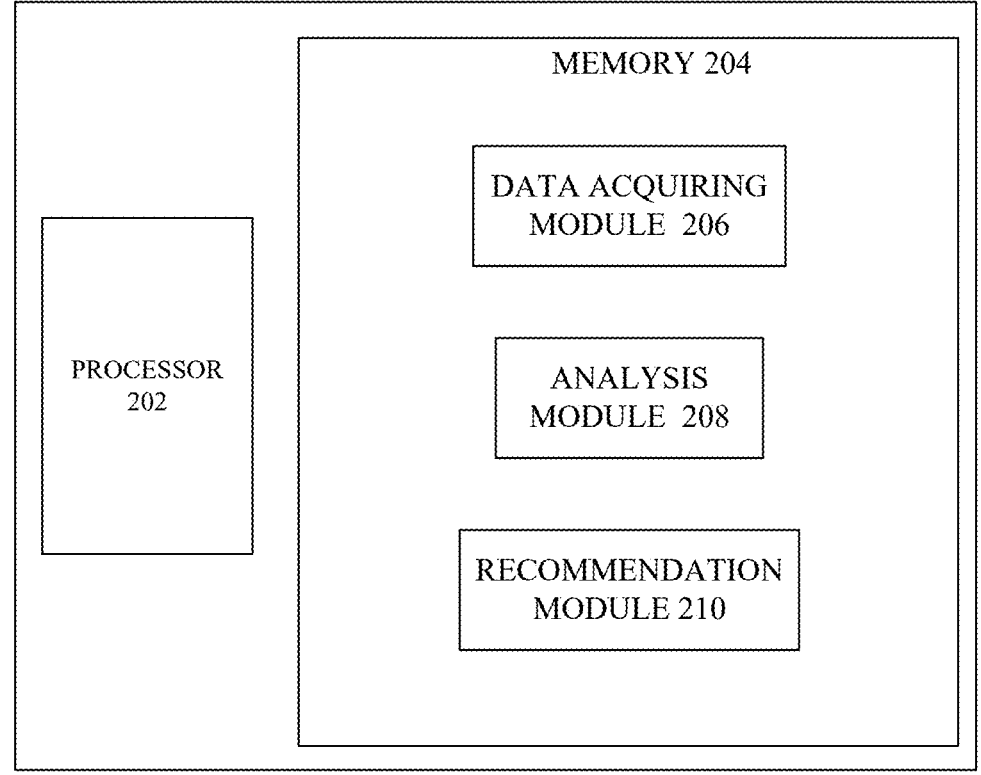
FIG. 2 is a block diagram of a system for predictive and real-time adaptive music recommendation, in accordance with some embodiments.

FIG. 2 is a block diagram of a system for predictive and real-time adaptive music recommendation, in accordance with some embodiments. Accordingly, the system may include a processor 202 and a memory 204. The memory 204 may be used to store software programs and modules of application software. In one embodiment. The processor 202 runs the software programs and modules stored in memory 204 to perform various functional applications and data processing, that is, to implement the method for predictive and real-time adaptive music recommendation. Memory 204 may include a high-speed random-access memory (RAM) and may also include non-volatile memory such as one or a plurality of magnetic storage apparatuses, a flash memory, or other non-volatile solid-state memories. In some examples, memory 204 may further include memories remotely provided with respect to the processor 202, and these remote memories may be connected to the processor 202 via a network. Examples of the aforementioned network include, but are not limited to, the Internet, intranets, local area networks, mobile communication networks, and the combinations thereof.

In one embodiment, the modules stored in the memory 204 comprise a data acquiring module 206, an analysis module 208, and a recommendation module 210. The data acquiring module 206 is configured to acquire data. In one embodiment, the data comprises biometric data and user input data. The biometric data may be collected from at least one multimodal biometric sensor. The at least one multimodal biometric sensor may obtain the biometric data of multiple biometrics sequentially, simultaneously, or a combination thereof. In one embodiment, the biometric data may comprise heart rate, skin temperature, electroencephalogram (EEG), electromyography (EMG), etc. In one embodiment, the user input data comprises at least one of the following: fitness level, workout type, workout intensity, mood, or preferred music genre. The present invention may comprise a user interface that allows the user to select or input information. In one embodiment, the data is received via a communication network. The communication network may be packet-switched and/or circuit-switched. An illustrative communication network includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VOIP) network, a SIP network, or combinations thereof.

The analysis module 208 is configured to analyze the data to determine a user state profile. The user state profile includes a physiological state and a psychological state of the user. In one embodiment, the analysis module 208 may be further configured to preprocess biometric data, such as EEG signals, by removing noise and artifacts to ensure clean, usable inputs. The analysis module 208 is further configured to identify key metrics from the preprocessed biometric data. For example, key metrics may include heart rate variability (HRV), EEG frequency bands, skin temperature fluctuations, etc.

The analysis module 208 is further configured to classify the physiological state and the psychological state based on a combination of the key metrics and the user input data. While key metrics alone, such as heart rate variability (HRV) to assess stress levels, EEG frequency bands (e.g., alpha, beta) to gauge alertness or relaxation, and skin temperature fluctuations to detect physical exertion or emotional arousal, can provide valuable insights, integrating user input data significantly enhances the precision and contextual relevance of the analysis. This integration enables the analysis module 208 to adjust the classification based on the user input data such as fitness level (to refine thresholds for physiological state determination), mood (to prioritize mood-related metrics for personalized tasks like music recommendations), and activity type (to apply tailored processing rules for specific activities, such as jogging, sprinting, cycling, weight training, or yoga). By merging biometric data with contextual user input data, the present invention provides a more precise and personalized assessment of user states. In a preferred embodiment, the data further comprises inherent contextual data including one or more of a time of day, user's location, and historical user music preferences. By incorporating these factors, the system delivers a more comprehensive and personalized music recommendation experience.

In a preferred embodiment, the analysis module 208 utilizes an artificial intelligence and/or machine learning algorithm to classify the physiological state and the psychological state based on the biometric data and the user input data. Examples of physiological states include resting, relaxed, active, fatigued, alert, etc. while psychological states may include happy, stressed, focused, anxious, sad, frustrated, confident, etc.

The recommendation module 210 is configured to generate the playlist based on the user state profile. By considering both the physiological and psychological states as well as the optional inherent contextual data, the present invention provides a comprehensive and hyper personalized approach to music recommendations during physical activities, leveraging the interrelationship between athlete, sport, and music.

In one embodiment, the analysis module 208 is further configured to track the data to identify changes in the data and update the user state profile based on the changes in the data. The recommendation module 210 is configured to modify the playlist in response to the updated user state profile. In this way, a feedback loop is created to continuously monitor the physiological state and the psychological state and dynamically adjust the playlist in real-time. Moreover, artificial intelligence and machine learning algorithms can be utilized to enable the system to evolve over time and enhance future recommendations. Such dynamic adjustments may include mood-specific adjustments, activity-specific adjustments, intensity-based adjustments, historical preferences integration, etc. For mood-specific adjustments, if a user reports feeling tired, the recommendation module 210 prioritizes upbeat tracks with fast tempos and energetic melodies, switching from relaxing playlists to high-energy genres like electronic dance music (EDM) or pop. Activity-specific adjustments tailor playlists to the user's activity. In an example where the user is weightlifting, the recommendation module 210 selects strong, rhythmic beats like rock or hip-hop and increases bass-heavy tracks to synchronize with the user's EMG-detected effort spikes. Intensity-based adjustments dynamically adapt to changes in physical activity. For example, during a running session, the user starts with a slow to moderate pace with a corresponding heart rate as a warm up for the first half of their activity and then increases their pace for the second half exceeding their previously set target heart rate. The recommendation module 210 transitions from tracks with a slow tempo to a higher tempo to match their increased pace and heart rate. Additionally, historical preferences integration refines playlists by learning user behavior, such as excluding frequently skipped artists during yoga sessions, and curating new playlists with ambient or instrumental tracks to better suit their preferences.

The present invention also allows users to share playlists and participate in group activities with combined biometric data inputs for synchronized music recommendations. In this embodiment, the data acquiring module 206 is configured to acquire from a plurality of users. The analysis module 208 is configured to analyze the data acquired from the plurality of users to determine a group user state profile. Moreover, the recommendation module 210 is configured to generate the list based on the group user state profile. The group user state profile represents the shared physiological and psychological states of the group, enabling the recommendation module 210 to generate playlists that align with the group's overall state. For example, in a group exercise class, such as a spin class, the instructor's biometric data (e.g., heart rate and cycling cadence) is combined with participants' data to determine a collective intensity level. The system then synchronizes the music, playing fast-tempo, high-energy tracks during peak intensity phases and slower tracks during recovery periods. In a team training session, like a soccer team's warm-up, shared biometric data reveals a moderate stress level and balanced heart rate variability. Based on this group user state profile, uplifting music is selected to boost morale without overstimulating players before the match. For social workouts, such as friends running together, shared heart rate and stride data can reveal varying energy levels. If one user is fatigued while others remain energetic, the system balances the playlist with motivating tracks to support the fatigued individual while maintaining a pace suitable for the group. In corporate wellness sessions, a meditation group's EEG and heart rate data might indicate high collective stress. The system responds by playing calming instrumental music specifically tailored to reduce stress and promote relaxation across the group.

Figure 3:
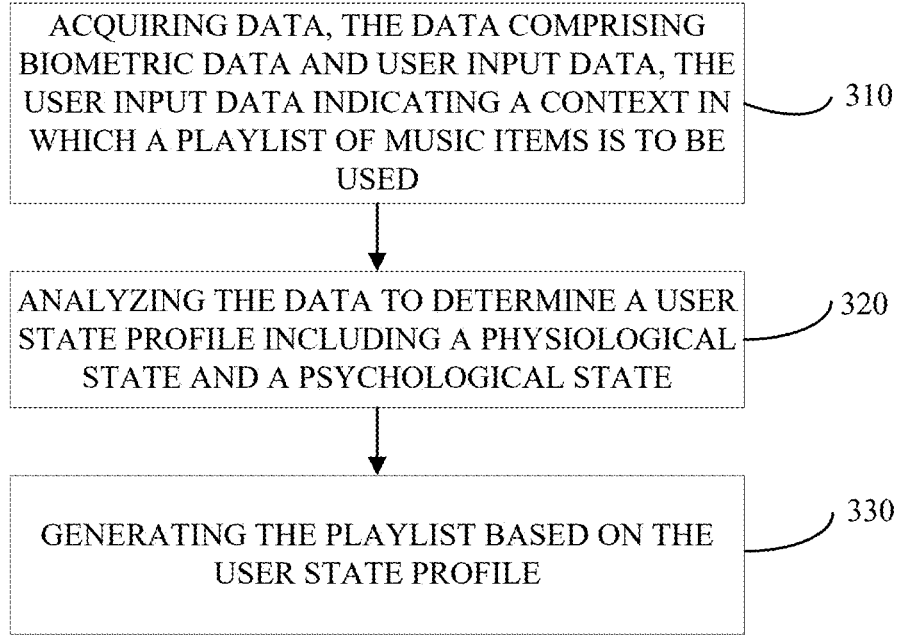
FIG. 3 is a flowchart of a method for predictive and real-time adaptive music recommendation, in accordance with some embodiments.
Figure 4:
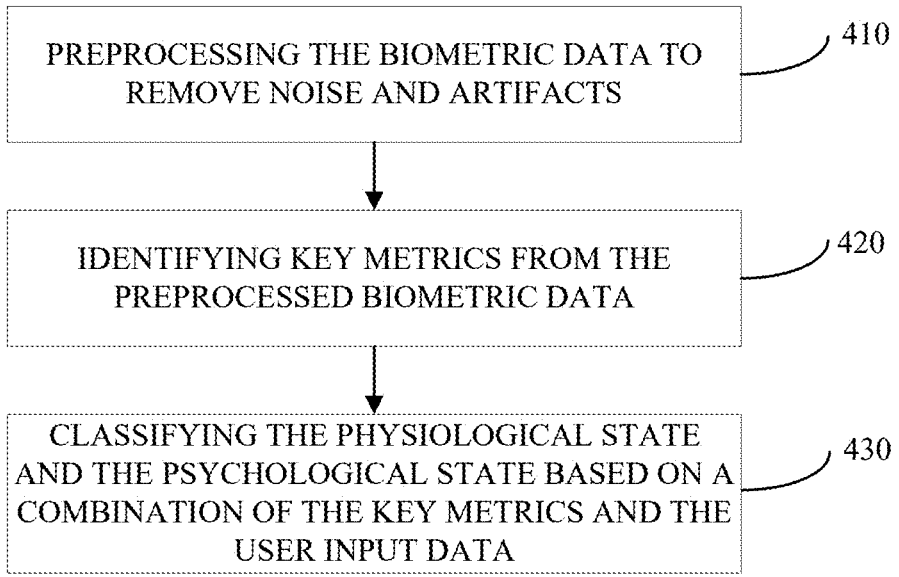
FIG. 4 is a flowchart of the data analysis for predictive and real-time adaptive music recommendation, in accordance with some embodiments.
Figure 6:
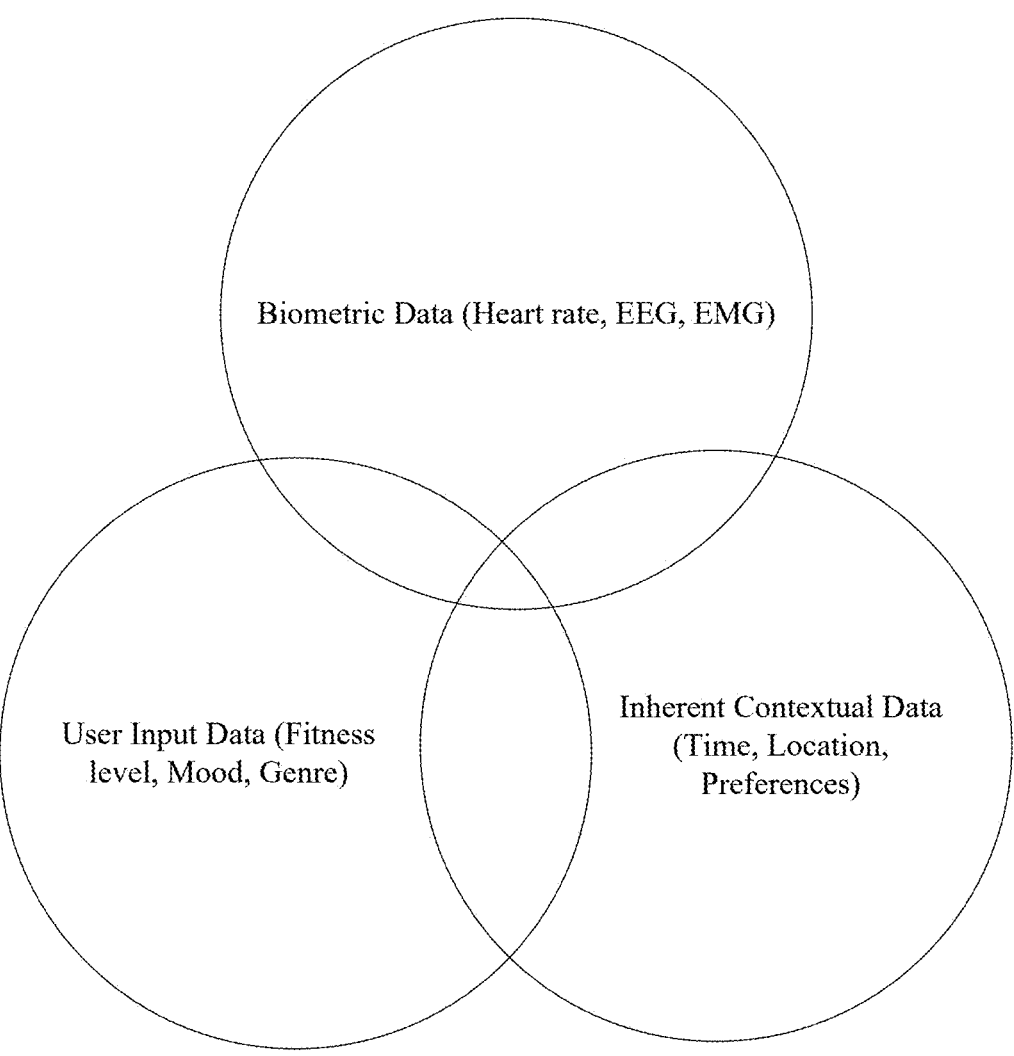
FIG. 6 is an illustration of data integration of the present invention.
Figure 7:
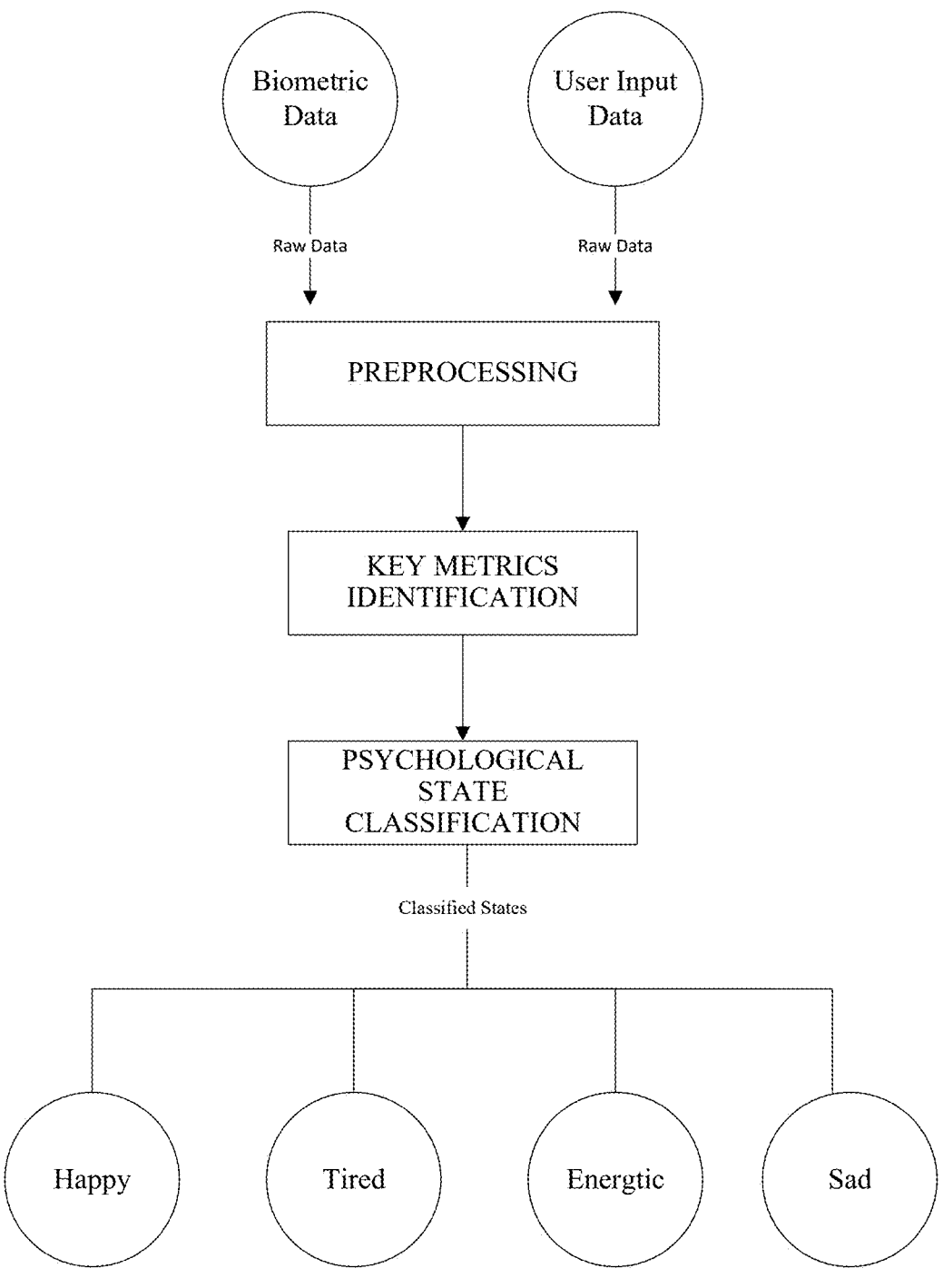
FIG. 7 is a flowchart of psychological state classification, in accordance with some embodiments.

FIG. 3 is a flowchart of a method 300 for predictive and real-time adaptive music recommendation. The method 300 comprises the following steps: acquiring at step 310 data, the data comprising biometric data and user input data, the user input data indicating a context in which a playlist of music items is to be used; analyzing at step 320 the data to determine a user state profile including a physiological state and a psychological state; and generating at step 330 the playlist based on the user state profile.

In one embodiment, the biometric data is collected from at least one multimodal biometric sensor. The user input data may comprise at least one of the following: fitness level, workout type, workout intensity, mood, or preferred music genre. In a preferred embodiment, the data further comprises inherent contextual data including one or more of a time of day, user's location, and historical user music preferences.

In one embodiment, analyzing the data further comprises: preprocessing at step 410 the biometric data to remove noise and artifacts; identifying at step 420 key metrics from the preprocessed biometric data; and classifying at step 430 the physiological state and the psychological state based on a combination of the key metrics and the user input data. In a preferred embodiment, a machine learning algorithm is used to classify the physiological state and the psychological state based on the biometric data and the user input data.

In one embodiment, the method further comprises: tracking at step 340 the data to identify changes in the data; updating at step 350 the user state profile based on the changes in the data; and modifying at step 360 the playlist in response to the updated user state profile. In one embodiment, the data is acquired from a plurality of users. Analyzing the data comprises analyzing the data acquired from the plurality of users to determine a group user state profile. The playlist is generated based on the group user state profile.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored in or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A predictive and real-time adaptive music recommendation method, comprising:
acquiring data, the data comprising biometric data from at least one multimodal biometric sensor and user input data explicitly entered by a user via a user interface, the user input data comprising at least a mood indicator, a workout type, and a workout type intensity level, the user input data indicating a context in which a playlist of music items is to be used;
analyzing the data to determine a user state profile, wherein analyzing comprises:
preprocessing the biometric data to remove se ad artifacts;
identifying key biometric metrics from the preprocessed biometric data; and
jointly classifying a physiological state and a psychological state based on a combination of the key biometric metrics and the user input data, wherein the mood indicator and the workout type and workout intensity level are used together with the key biometric metrics as joint inputs to configure and perform the state classification using a machine learning algorithm; and
generating the playlist based on the user state profile comprising the physiological state and the psychological state.

2. The method as claimed in claim 1, wherein the biometric data is collected from at least one multimodal biometric sensor.

3. The method as claimed in claim 1, wherein analyzing the data comprises:
preprocessing the biometric data to remove noise and artifacts;
identifying key metrics from the preprocessed biometric data; and
classifying the physiological state and the psychological state based on a combination of the key metrics and the user input data.

4. The method as claimed in claim 1, wherein a machine learning algorithm is used to classify the physiological state and the psychological state based on the biometric data and the user input data.

5. The method as claimed in claim 1, further comprising:
tracking the data to identify changes in the data;
updating the user state profile based on the changes in the data;
modifying the playlist in response to the updated user state profile.

6. The method as claimed in claim 1, wherein the data is acquired from a plurality of users, and wherein analyzing the data comprises analyzing the data acquired from the plurality of users to determine a group user state profile representing aggregated physiological and psychological states of the plurality of users, and wherein the playlist is generated for concurrent playback to the plurality of users to synchronize a physical activity session among the plurality of users based on the group user state profile, wherein generating the playlist for concurrent playback comprises:
initiating playback at the same time on devices associated with the plurality of users; and coordinating track transitions among the devices based on the group user state profile.

7. A predictive and real-time adaptive music recommendation system, comprising:

a processor;

a memory, wherein modules are stored in the memory for execution by the processor, the modules comprising:

a data acquiring module configured to acquire data, the data comprising biometric data from at least one multimodal biometric sensor and user input data explicitly entered by a user via a user interface, the user input data comprising at least a mood indicator, a workout type, and a workout intensity level, the user input data indicating a context in which a playlist of music items is to be used;

an analysis module configured to analyze the data to determine a user state profile, wherein the analysis module is configured to, preprocess the biometric data to remove noise and artifacts;

identify key biometric metrics from the preprocessed biometric data; and jointly classify a physiological state and a psychological state based on a combination of the key biometric metrics and the user input data, wherein the mood indicator, the workout type, and the workout intensity level are used together with the key biometric metrics as joint inputs to configure and perform the state classification using a machine learning algorithm; and a recommendation module configured to generate the playlist based on the user state profile comprising the physiological state and the psychological state.

8. The system as claimed in claim 7, wherein the biometric data is collected from at least one multimodal biometric sensor.

9. The system as claimed in claim 7, wherein the analysis module is configured to preprocess the biometric data to remove noise and artifacts, identify key metrics from the preprocessed biometric data, and classify the physiological state and the psychological state based on a combination of the key metrics and the user input data.

10. The system as claimed in claim 7, wherein a machine learning algorithm is used to classify the physiological state and the psychological state based on the biometric data and the user input data.

11. The system as claimed in claim 7, wherein the analysis module is further configured to track the data to identify changes in the data and update the user state profile based on the changes in the data, and the recommendation module is further configured to modify the playlist in response to the updated user state profile.

12. The system as claimed in claim 7, wherein the data acquiring module is configured to acquire data from a plurality of users, and wherein the analysis module is configured to analyze the data acquired from the plurality of users to determine a group user state profile representing aggregated physiological and psychological es of the plurality of users, and wherein the recommendation module is configured to generate the playlist for concurrent playback to the plurality of users to synchronize a physical activity session among the plurality of users based on the group user state profile, wherein generating the playlist for concurrent playback comprises:

initiating playback at the same time on devices associated with the plurality of users; and coordinating track transitions among the devices based on the group user state profile.

* * * * *